United States Patent [19]

Wilson

[11] Patent Number: 4,768,750
[45] Date of Patent: Sep. 6, 1988

[54] VALVE JOINT CONNECTION

[75] Inventor: Robert T. Wilson, Marshalltown, Iowa

[73] Assignee: Fisher Controls International, Inc., Marshalltown, Iowa

[21] Appl. No.: 5,575

[22] Filed: Jan. 16, 1987

[51] Int. Cl.⁴ .............................................. F16K 1/22
[52] U.S. Cl. ................................... 251/308; 403/324; 403/379
[58] Field of Search ................ 251/308; 403/324, 355, 403/378, 379

[56] References Cited

U.S. PATENT DOCUMENTS

| | | | |
|---|---|---|---|
| 2,586,927 | 2/1952 | Fantz | 251/308 X |
| 3,517,689 | 6/1970 | Roos | 251/308 X |
| 4,057,217 | 11/1977 | MacDonald | 251/308 |
| 4,171,822 | 10/1979 | Thun | 403/355 X |
| 4,546,670 | 10/1985 | Gaspardo | 403/378 X |
| 4,579,477 | 4/1986 | Hartmann | 403/324 |

Primary Examiner—A. Michael Chambers
Assistant Examiner—John C. Fox
Attorney, Agent, or Firm—Marshall, O'Toole, Gerstein, Murray & Bicknell

[57] ABSTRACT

An improved joint connection between a rotary valve shaft and valve closure member for a fluid valve. A tapered key has a flat surface tapered at a small angle with respect to the opposite key surface. The rotary valve shaft includes a groove with a flat surface. The tapered key is wedged into a passageway in the valve closure member to form an interference fit between the closure member, key and shaft.

7 Claims, 1 Drawing Sheet

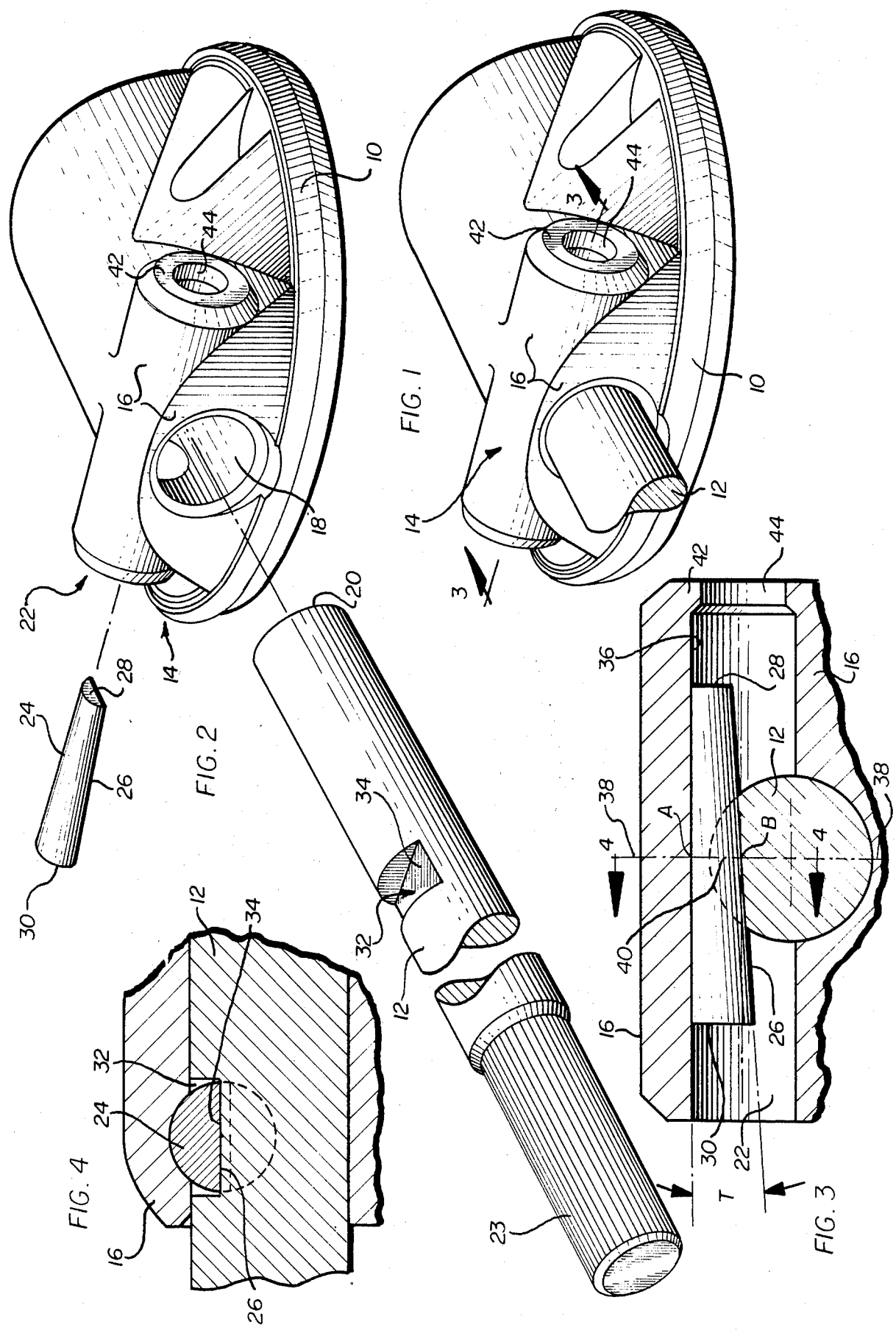

VALVE JOINT CONNECTION

This invention relates to fluid valves, and in particular to an improved joint connection between a driving member and a driven member, such as a valve closure member and a valve shaft.

BACKGROUND OF THE INVENTION

Fluid valves are used extensively in pipelines for controlling the flow of various fluids by rotating a driving member, such as a valve shaft, which is connected by a joint connection to a driven member, such as a valve closure member. In assembling the joint connection for a valve currently in use, the valve shaft is inserted into the valve closure member and holes are drilled through the closure member and into the shaft. A taper reamer is then inserted into the holes to make a tapered hole extending from the valve closure member and into the shaft.

Next, tapered pins having a tapered cylindrical, cone-shaped cross section, are inserted into the valve closure member and wedged into the tapered hole joint between the shaft and the closure member. Two or more pins are used, and the pins must be selected in taper and length to match the particular tapered hole made by the taper reamer. Matching of the two or more taper pins to a particular tapered hole made by the taper reamer leads to a time consuming installation procedure. As an example, if the person making the taper reamer inserted the taper reamer tool just a small amount into the drilled hole, the taper would be narrower and different than if the reamer was inserted farther or deeper into the hole. Accordingly, the taper pins must be carefully matched to the particular taper set by the depth of insertion of the taper reamer. The tapered holes formed by the taper reamer results in two matched parts, i.e., the closure member and the shaft. Furthermore, if the joint connection fails and must be repaired, the same time consuming matching of two or more taper pins to be wedged into the particular tapered hole is required as in the initial valve assembly.

Accordingly, it is desired to provide a fluid valve with an improved joint connection which can be more readily assembled in significantly less time and with less critical parts than prior units.

Furthermore, it is desired to provide a valve closure member and valve shaft joint interconnection wherein the joint component parts are completely interchangeable thereby eliminating any need for prior matched set of joint parts requiring special fitting at the time of assembly.

SUMMARY OF THE INVENTION

In accordance with the principles of the present invention, there is provided a fluid valve with an improved joint connection for a driving member and a driven member, such as for a rotary valve shaft and valve closure member. A taper key is provided with a flat surface on one side which is tapered at a small angle with respect to the opposite key surface. A valve shaft is provided with a groove having a flat surface. The key and the shaft groove thus have complementary surfaces.

The valve closure member includes a first passageway to accommodate the valve shaft, and a second passageway transverse to the first passageway and communicating with the first passageway to accommodate insertion of the taper key. The taper key is inserted into the second passageway with the flat taper key surface engaging the complementary flat surface in the shaft groove. An interference fit is provided between the joint connection components.

It is preferred that the taper key is approximately a half round piece of metal stock with a 2°-8° taper between the flat key surface and the opposite key surface. Also, it is preferred that at the center-midpoint of the key length, that the key is approximately half round, i.e., has a semi-circular cross section at the midpoint. Thus, at the midpoint of the key length, the distance between the taper key flat surface and the opposite taper key surface is approximately one-half the key diameter so as to substantially equalize the contact surfaces between the taper key, second passageway, and shaft, on each side of the shaft center line.

The improved joint connection of this invention may also be provided in a linear motion connection device such as in a plug to stem connection or as an actuator to stem connection.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 1 is a perspective view illustrating an assembled valve shaft and valve closure member in a fluid valve;

FIG. 2 is an exploded perspective view illustrating the valve closure member, valve shaft and taper key joint connection of the unit shown in FIG. 1;

FIG. 3 is a sectional view taken along section line 3—3 of FIG. 1; and

FIG. 4 is a sectional view taken along section line 4—4 of FIG. 3.

DETAILED DESCRIPTION

Referring to the drawings, there is illustrated a valve closure member 10, a valve shaft 12 and a joint connection 14 for a fluid valve. A boss 16 extends from the top of the closure member and is formed with a first passageway 18 for receiving shaft end 20 and a second passageway 22 formed transversely to passageway 18 and offset from the center line of passageway 18. Passageway 22 communicates with passageway 18. Shaft end 23 is normally rotatably driven through gear boxes, hand wheels, or power driven means for suitable fluid valve control.

It is understood that while the present invention is illustrated in connection with a butterfly disc-type valve closure member, other types of closure members can also be utilized with the invention. As an example, the present invention is useful for fluid valves controlling the flow of liquid or gas in pipelines, as well as in other types of processing fluid control systems. In addition to the illustrated butterfly-type valve, the present invention may also be used with other fluid valve-type closure members such as a plug, or ball.

A taper key 24 formed of cylindrical stock is cut longitudinally to form a flat surface 26 extending between key end 28 to key end 30 with a slight taper, T, between flat surface 26 and the opposite side of key 24. Preferably, key 24 is approximately a half round piece of metal stock with a 2°-8° taper, T, between flat side 26 and the opposite key side.

Shaft 12 includes a groove 32 formed with a flat surface 34 adapted to engage a key flat surface 26. As can be seen from FIG. 3, second passageway 22 in boss 16 is offset from first passageway 18 in the boss. Thus, when shaft end 20 is inserted into first passageway 18 with groove 32 aligned with second passageway 22, pin 24 inserted into passageway 22 can be wedged between shaft flat surface 34 and inner wall surface 36 of passageway 22. The small taper on key 24 provides an interference fit between the shaft, and the boss. The key is set into its final position using a flat ended punch and hammer and is driven to its final position with several sharp blows to key end 30. If more permanent holding is required, the end 30 of the pin can be tack welded to the closure member. The key and joint can be made large enough in size to support the torque loads that will occur during shaft rotation and to provide the valve cycle life required for the closure member 10, key 24 and shaft 12. With prior valve units using taper pins, this feature could only be provided if more taper pins were utilized, thereby significantly increasing the already time consuming valve assembly procedure.

It is preferred that the contact surface area in the joint connection is equalized on each side of shaft center line 38. This provides a very reliable joint connection with minimum lost motion between the valve shaft and the valve closure member when the valve is subjected to the typical rotary forces on the shaft that are required to open and close valve closure member 10. Key taper, T, and the key length between key ends 28, 30 is made such that at key midpoint 40, the key is half round, i.e., has a semi-circular cross section at the midpoint. In other words, the lineal distance between reference points A and B on the taper key (see FIG. 3) is made to be equal to one half the diameter of the key pin cylindrical stock cross-section. Thus, when the key is inserted into passageway 22 and wedged into the interference fit position, reference points A, B and key midpoint 40 become aligned with shaft center line 38 so that there are substantially equal contact surfaces in the joint elements on both sides of the shaft center line.

As can be seen most clearly from FIG. 3, passageway 22 in boss 16 narrows considerably at one boss end 42 to a narrower passageway 44. This provides an indexing means during assembly of the unit so as to insure that the taper key is always inserted into and mounted within the same side of passageway 22. Thus, the shaft will always be indexed correctly for receiving the actuator.

The present invention enables the use of one taper key size for each shaft size. Accordingly, in addition to the aforementioned advantages over the prior art, the present invention also provides the capability of only needing to stock valve component parts and not complete matched assemblies. Furthermore, damaged valve parts could be replaced easily rather than requiring the matching of several components as in the prior art.

It is understood that other shapes of the key, shaft groove and passageways could be used, provided the respective surfaces are complementary.

Rather than being formed of cylindrical stock, key 24 could instead be formed of a rectangular stock with a similar tapered flat surface. In that case, passageway 22 would be adapted to match the rectangular key cross section. In addition, a key could be made the reverse of the existing key so as to be flat on the closure member side and round against the shaft. Furthermore, the improved joint connection described herein could be provided between the valve shaft and an actuator lever that drives the valve shaft.

The foregoing detailed description has been given for clearness of understanding only, and no unnecessary limitations should be understood therefrom, as modifications will be obvious to those skilled in the art.

What is claimed is:

1. In a fluid valve, including a valve closure member and a shaft connected to the closure member and rotatable to rotate the closure member, an improved joint connection between the closure member and the shaft comprising:
   a passageway in the valve closure member adapted to receive one end of the shaft;
   a groove in said one shaft end located to be within the passageway upon insertion of the shaft one end in the passageway, said groove having a groove surface in the shaft opposite an inside surface of the passageway;
   a second passageway in the valve closure member extending transversely to, offset from, and communicating with the first passageway, said second passageway disposed in alignment with said groove in the shaft; and
   a key adapted for insertion into the second passageway and having a key surface on one key side formed with a taper with respect to the opposite key side, said key surface complementary to said groove surface and engageably contacting said groove surface in the shaft in a friction fit between the shaft and the valve closure member second passageway, and wherein at the midpoint of the key length, the key is formed with a semi-circular cross section;
   said groove in said one shaft end formed with the distance between said groove surface and said opposite inside surface of the passageway being substantially equal to the radius of said key semi-circular cross section to provide substantially equal surface contacts on each side of the shaft centerline between the key and the shaft, and between the key and the valve closure member second passageway.

2. A fluid valve according to claim 1, wherein said key surface and said complementary groove surface are each flat surfaces.

3. A fluid valve according to claim 2, wherein said taper is between about 2°-8° referenced to be on the tapered side of the key.

4. In a fluid valve, including a valve closure member and a shaft connected to the closure member and rotatable to rotate the closure member, an improved joint connection between the closure member and the shaft comprising:
   a boss formed on the valve closure member;
   said shaft including a groove having a flat surface at one shaft end;
   a first passageway in the boss adapted to receive said one shaft end with the groove flat surface opposite an inside surface of the first passageway;
   a second passageway in the boss extending transversely to and communicating with the first passageway, with said shaft groove disposed in alignment with the second passageway;
   a key adapted for insertion into the second passageway and having a flat surface on one key side formed with a taper with respect to the opposite key side, said key flat surface engageably contacting said shaft groove flat surface;

said key, shaft, and boss forming an interference fit in the joint connection; and wherein (1) at the midpoint of the key length, the key is formed with a semi-circular cross section, and (2) said groove in said one shaft end is formed with the distance between said groove flat surface and said opposite inside surface of the first passageway being substantially equal to the radius of said key semi-circular cross section to provide substantially equal surface contacts of the key, shaft and boss on each side of the shaft centerline.

5. A fluid valve according to claim 4, wherein said second passageway is offset from said first passageway.

6. A fluid valve according to claim 4, wherein said key is formed of cylindrical stock.

7. A fluid valve according to claim 6, wherein said taper is between about 2°–8° referenced to be on the tapered side of the key.

* * * * *